Nov. 17, 1970    J. L. PECZKOWSKI ET AL    3,540,217
COMBUSTION ENGINE FUEL CONTROL
Filed June 27, 1968    2 Sheets-Sheet 1

INVENTORS
JOSEPH L. PECZKOWSKI
KENNETH R. DETTWEILER
FRANCIS R. ROGERS
BY
Gordon H. Chang
AGENT

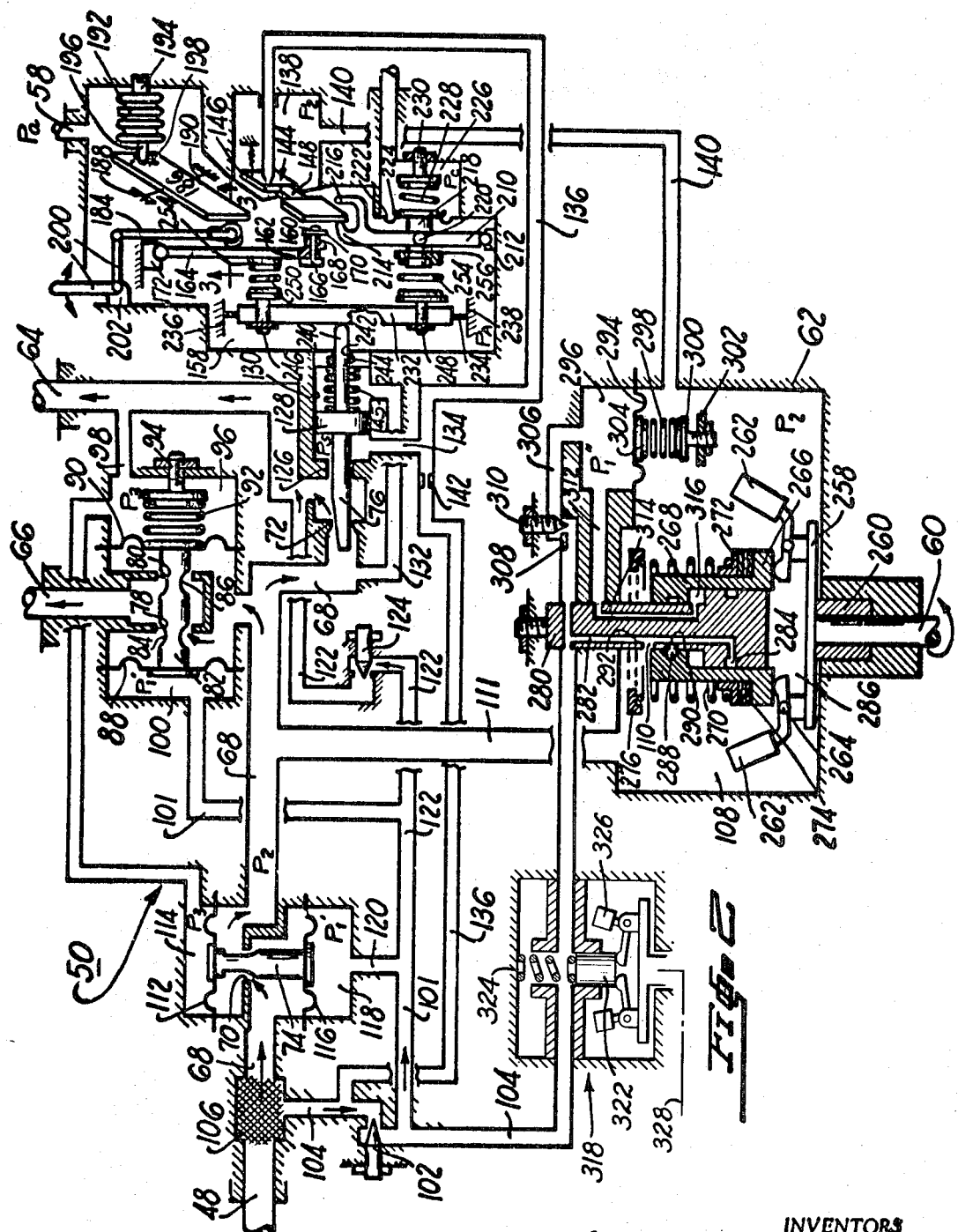

3,540,217
COMBUSTION ENGINE FUEL CONTROL
Joseph L. Peczkowski, Kenneth R. Dettweiler, and Francis R. Rogers, South Bend, Ind., assignors to The Bendix Corporation, a corporation of Delaware
Filed June 27, 1968, Ser. No. 740,551
Int. Cl. F02c 9/08
U.S. Cl. 60—39.28                           11 Claims

ABSTRACT OF THE DISCLOSURE

Fuel control apparatus for a gas turbine engine wherein output fuel flow during an engine transient from one speed to another is controlled by a variable area fuel metering valve as a function of throttle lever position, ambient air pressure and compressor pressure rise. A fuel by-pass valve maintains a predetermined constant fuel pressure differential across the metering valve. Engine governing operation at a selected speed is accomplished by governor valve means responsive to engine speed and throttle lever position and connected to modify the response of the fuel by-pass valve to generate a variable fuel pressure differential across the metering valve. The governor valve response to engine speed is modified by a lagged regenerative feedback signal derived from a fuel pressure controlled by the governor valve and applied against the governor valve to augment the engine speed input.

Variable speed combustion engine fuel controls and, in particular, gas turbine fuel controls of the free turbine type are necessarily relatively complex mechanisms by virtue of the variable dynamic characteristics exhibited by the gas turbine engine and various loads as well as the degree of accuracy and reliability imposed on the regulation of fuel flow to the engine to effect the desired control over the same without exceeding the engine limitations. Furthermore, the initial cost of any given fuel control as well as subsequent maintenance thereof necessarily increases with the degree of complexity of the control.

It is an object of the present invention to provide a fuel control for a gas turbine engine of the free turbine type which fuel control employs a relatively simple and reliable control newtork for controlling the fuel metering valve during engine accelerations and decelerations and a fuel pressure differential across the fuel metering valve during governing operation at a selected engine speed.

It is another object of the present invention to provide a fuel control for a gas turbine engine of the variable speed free turbine type which fuel control utilizes relatively simple and inexpensive control components which require little maintenance to effect continued accurate and reliable control over fuel flow to the engine.

Other objects and advantages of the present invention will be apparent from the following description taken with the accompanying drawings wherein:

FIG. 2 is an enlarged schematic view of the fuel meter 50 of FIG. 1 embodying the present invention;

Figure 1:
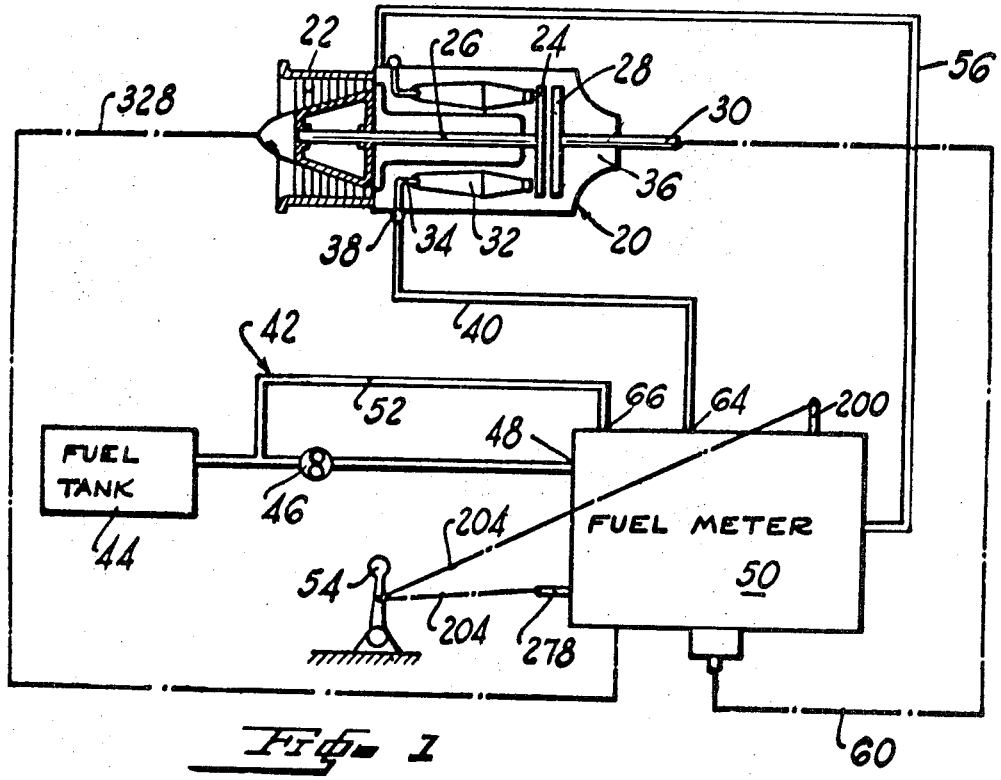
FIG. 1 is a schematic representation of a gas turbine engine of the free turbine type and a fuel control system therefor embodying the present invention.
Figure 3:
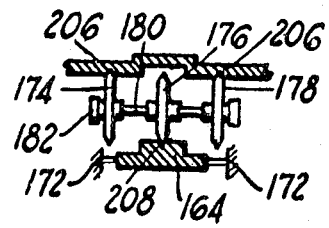
FIG. 3 is a sectional view taken on line 3—3 of FIG. 2.

Referring to the drawings, numeral 20 designates a conventional gas turbine engine having an air compressor 22 connected to be driven by a turbine 24 via a shaft 26 and a free or power turbine 28 downstream from turbine 24 and rotatable independently thereof. The free turbine 28 is connected to suitable conventional power transmitting means generally indicated by 30 to drive power absorbing apparatus such as helicopter rotor blades, wheels of a ground vehicle or similar variable speed engine applications as will be recognized by those persons skilled in the art. The engine 20 is provided with combustion chambers 32 adapted for pressurization with air delivered by compressor 22 and provided with fuel injection nozzles 34 connected to inject metered pressurized fuel therein where the resulting air-fuel mixture is ignited to generate a continuous flow of hot motive gas. The hot motive gas discharged from combustion chambers 32 passes through turbine 24 generating torque to drive compressor 22 and through free turbine 28 to generate torque for external use. The spent gas discharged from free turbine 28 passes through engine outlet 36 to the atmosphere.

The fuel nozzles 34 are supplied pressurized metered fuel via a fuel manifold 38 and fuel supply conduit 40 which receive metered fuel flow from a fuel control network embodying the present invention and generally designated by 42.

The fuel control network 42 includes a fuel source 44 connected to supply fuel to the inlet of an engine driven pump 46, preferably of the positive displacement gear type, which, in turn, discharges pressurized fuel to the inlet 48 of a fuel meter generally indicated by 50. A fuel by-pass conduit 52 connecting fuel meter 50 with the inlet of pump 46 conducts fuel in excess of engine requirements for recirculation through pump 46.

The fuel meter 50 responds to a plurality of engine operating conditions for fuel control purposes. To that end, the fuel meter 50 is connected via suitable linkage to a control lever 54 movable over the indicated range of power positions, via a passage 56 transmitting compressor discharge pressurized air, via a vent 58 to atmospheric air pressure $P_a$ and via a rotatable gear and shaft means 60 to the free turbine 28.

Referring to FIG. 2, the fuel meter 50, per se, is shown in enlarged schematic form to clearly illustrate the various component mechanisms thereof and the manner of cooperation thereof. A casing 62 receives pump discharge flow at pressure $P_1$ via inlet port 48 and is provided with outlet ports 64 and 66 connected to fuel supply conduit 40 and fuel by-pass conduit 52, respectively. Fuel passes from inlet port 48 to outlet port 64 via conduit 68 having flow restrictions 70 and 72 in series therein. A throttling valve 74 cooperates with restriction 70 to define a variable effective flow area of the latter which, in turn, regulates the fuel pressure $B_2$ downstream therefrom accordingly. A fuel metering valve 76 cooperates with restriction 72 to define a variable effective flow area of the latter which, in turn, determines the quantity of metered fuel at pressure $P_3$ passing through outlet 64 to the engine. Fuel is vented from conduit 68 intermediate restrictions 70 and 72 to outlet port 66 via spaced, axially aligned by-pass restrictions 78 and 80. A fuel by-pass valve 82 having spaced annular depressions 84 and 86 adapted to cooperate with restrictions 78 and 80, respectively, is axially aligned with restrictions 78 and 80 and movable relative thereto to vary the effective flow area of restrictions 78 and 80 and thus the quantity of by-pass fuel which, in turn, regulates the fuel pressure $P_2$ in conduit 68 accordingly. The by-pass valve 82 is fixedly secured at one end to a diaphragm 88 and at the opposite end to a diaphragm 90 both of which diaphragms are suitably clamped at the radially outermost portions thereof to casing 62 by any suitable conventional means, not shown, providing a fluid seal between opposite sides thereof. A compression spring 92 interposed between one end of valve 82 and an adjustable spring retainer 94 threadedly engaged with casing 62 serves to preload valve 82 toward a closed position. The diaphragms 88 and 90 are preferably of equal effective areas with opposing sides thereof exposed to fuel pressure $P_2$ so that the resulting oppositely directed equal forces imposed on valve 82 cancel out.

The opposite side of diaphragm 90 is exposed to a chamber 96 which is vented to conduit 68 at metered fuel pressure $P_3$ via a passage 98. The opposite side of diaphragm 88 is exposed to a chamber 100 which is vented via a passage 101 to fuel pressure $P_1'$ generated on the downstream side of an adjustable restriction 102. Thte restriction 102 is in flow controlling relationship with a conduit 104 which receives fuel from conduit 68 at fuel pressure $P_1$ through a filter element 106 and discharges fuel to a chamber 108 through a variable area governor valve orifice generally indicated by 110. A passage 111 vents chamber 108 to conduit 68 at fuel pressure $P_2$ intermediate valves 74 and 76.

The throttling valve 74 is fixedly secured at one end to a diaphragm 112 which has one side exposed to conduit 68 at fuel pressure $P_2$ on the downstream side of restriction 70 and an opposite side exposed to a chamber 114 which is vented to chamber 96 at fuel pressure $P_3$. A diaphragm 116 fixedly secured to the opposite end of throttling valve 74 has one side exposed to conduit 68 at fuel pressure $P_1$ on the upstream side of restriction 70 and an opposite side exposed to a chamber 118 which is vented via a passage 120 to passage 101 at fuel pressure $P_1'$. The throttling valve 74 is axially aligned with restriction 70 and movable relative thereto in a closing direction in response to the $P_2-P_3$ pressure differential across diaphragm 112 and in an opening direction in response to the $P_1-P_1'$ pressure differential across diaphragm 116.

A branch passage 122 containing an adjustable restriction 124 connects passage 101 with conduit 68 at metered fuel pressure $P_3$ on the downstream side of metering restriction 72 to provide for minimum fuel flow requirements of the engine.

The metering valve 76 is slidably carried in an opening 126 in casing 62 and extends therethrough into fixed engagement with a servo piston 128 slidably carried in a chamber 130. The chamber 130 on one side of piston 128 is vented via a passage 132 to conduit 68 at fuel pressure $P_2$ upstream from metering restriction 72. The chamber 130 on the opposite side of piston 128 is vented via a passage 134 to a controlled servo pressure $P_s$ generated in a passage 136 leading from passage 104 upstream from restriction 102 to a chamber 138 which chamber, in turn, is vented via a passage 140 to chamber 108 at fuel pressure $P_2$. The servo pressure $P_s$ generated downstream from a fixed restriction 142 in passage 136 varies in accordance with the position of a flapper valve 144 controlling the effective flow area of the discharge end of passage 136. A compression spring 145 interposed between piston 128 and one end of chamber 130 urges metering valve 76 toward a closed position.

The flapper valve 144 is defined by one end of a spring loaded lever 146 pivotally mounted to casing 62 via a shaft 148. The opposite end of lever 146 extends into a chamber 158 vented to atmospheric air pressure via port 58 and is engaged by a tappet 160 slidably carried in an opening 162 in one end of a lever 164. A stop 166 on tappet 160 engages lever 164 under the influence of a compression spring 168 interposed between lever 164 and spacing retainer 170 integral with tappet 160. The lever 164 is mounted for pivotal movement on a fixed support 172. A plurality of roller members 174, 176 and 178 rotatably mounted on a shaft 180 which, in turn, is mounted to a yoked end 182 of a shaft 184 are adapted to transmit a force from a lever 186 to lever 164. The lever 186 is mounted for pivotal movement on a fixed support 188 by a shaft 190. The force applied by lever 186 is derived from an evacuated bellows 192 anchored at one end to casing 62 by an adjustable support 194 threadedly engaged with casing 62. The opposite movable end of bellows 192 is provided with a stem 196 fixedly secured thereto and extending into pivotal engagement with a bracket 198 fixedly secured to lever 186. The bellows 192 is exposed to atmospheric air pressure $P_a$ in chamber 158 and expands or contracts in response to pressure variations thereby imposing a corresponding variable force on lever 186.

The shaft 184 is pivotally secured to a bell crank 200 pivotally mounted to a fixed support 202 and actuated by control lever 54 via suitable linkage means generally indicated by 204. The rollers 174 and 178 are guided by suitable tracks 206 on lever 186 and move perpendicular to the pivot axis of lever 164 to thereby vary the effective lever arm of the latter as a function of the position of control lever 54. The roller 176 is guided by a track 208 on lever 164 and moves parallel to the pivot axis of lever 186 such that the effective lever arm of lever 186 and thus the force applied through roller 176 for any given pressure $P_a$ acting against bellows 192 remains constant regardless of the position taken by roller 176 in response to control lever 54.

A lever 210 pivotally mounted on a fixed support 212 is provided with spaced arm portions 214 adapted and is provided with spaced arm portions 214 and 216 adapted to engage lever 146 extending therebetween. A stem 218 pivotally secured to lever 210 by a pin 220 is fixedly secured to the center portion of a diaphragm 222 by any suitable fastening means such as backing plate 224. The diaphragm 222 separates chamber 158 from a chamber 226 and is responsive to the differential between pressure $P_a$ in chamber 158 and compressor discharge air pressure $P_c$ vented to chamber 226 via passage 56. The diaphragm 222 is preloaded by a compression spring 228 interposed between backing plate 224 and adjustable spring retainer 230 threadedly engaged with casing 62.

The position of metering valve 76 is transmitted via feedback forces to levers 164 and 210. To that end, a lever 232 pivotally mounted via a shaft 234 connecting the same to fixed supports 236 and 238 is engaged by a stem 240 extending from servo piston 128 and through an opening 242 at one end of chamber 130. Suitable seal means such as O ring 244 mounted in opening 242 slidably engages stem 240 thereby providing a fluid seal between chambers 130 and 158. Spaced apart adjustable spring retainers 246 and 248 are threadedly engaged with lever 232. A compression spring 250 is interposed between spring retainer 246 and a spring retainer 252 on lever 164. A compression spring 254 is interposed between spring retainer 248 and a spring retainer 256 on stem 218.

A rotatable table 258 suitably mounted on bearing 260 for rotation in chamber 108 is actuated by turbine driven shaft 60. Centrifugal weights 262 pivotally mounted by pins 264 to table 258 are adapted to bear against a flanged end 266 of a sleeve 268 mounted to rotate with weights 262. The output force of centrifugal weights 262 opposes a compression spring 270 interposed between an annular spring retainer 272 concentric with sleeve 268 rotatable relative thereto. Conventional bearing means such as a ball bearing 274 interposed between spring retainer 272 and flanged end 266 of sleeve 268 provides for rotation of sleeve 268 relative to retainer 272 and transmits the thrust force derived from spring 270 to sleeve 268. The opposite end of compression spring 270 is retained by an adjustable retaining ring 276 actuated by a lever 278 connected to control lever 54 to thereby compress spring 270 and establish a reference force as a function of control lever 54 position. The sleeve 268 is rotatably mounted on an adjustable fixed support 280 threadedly engaged with casing 62. A passage 282 in support 280 communicates conduit 104 with an annulus 284 in an enlarged end portion 286 of support 280. An annulus 288 in sleeve 268 communicates with passage 282 via branch passage 290 in support 280. The pressurized fuel $P_1'$ supplied to annulus 284 and annulus 288 serves as a lubricant between adjacent sliding surfaces of rotatably and axially movable sleeve 268 and fixed support 280.

The variable area governor valve orifice 110 is defined by the upper end of sleeve 268 which cooperates with an orifice 292 which vents passage 282 to chamber 108 at relatively lower fuel pressure $P_2$. The axial position of sleeve 268 determines the effective flow area of orifice 292 and thus the fuel pressure $P_1'$ upstream therefrom in accordance with the opposing forces imposed on sleeve 268 and derived from spring 270 and centrifugal weights 262.

A diaphragm 294 separating chamber 108 from a chamber 296 is secured at its radially outermost portion to casing 62 by any suitable fastening means, not shown, providing a fluid seal. A spring preload is imposed against diaphragm 294 by a compression spring 298 interposed between an adjustable spring retainer 300 threadedly engaged with a fixed support 302 and a spring retainer 304 suitably secured to the center portion of diaphragm 294. The chamber 296 is vented to conduit 104 via a passage 306 containing an adjustable flow restriction 308 including valve 310 threadedly secured to casing 62. The chamber 296 is further vented via passages 312 and 314 in casing 62 and support 280, respectively, to a chamber 316 defined by sleeve 268 and support 280.

OPERATION

It will be assumed initially that the engine is stable in operation with free turbine 28 operating at a speed corresponding to the set position of control lever 54 under given atmospheric pressure $P_a$ and compressor discharge air pressure $P_c$.

Assuming the control lever 54 is advanced to a position requesting an engine acceleration to a higher free turbine 28 speed, the spring retainer 276 and rollers 174, 176 and 178 are actuated simultaneous by the respective lever 278 and bell crank 200. The rollers 174, 176 and 178 are driven away from the pivot axis of lever 164 thereby increasing the effective lever arm through which the force applied by lever 186 acts in opposition to spring 250. The lever 164 being unbalanced in a clockwise direction as viewed in FIG. 2 causes flapper 144 carried by lever 146 to move toward passage 136 thereby decreasing the flow therefrom which, in turn, increases the fuel pressure $P_s$ acting against piston 128. It will be understood that the single control lever 54 may be replaced by two independently actuated control levers, not shown, one of which may be connected to actuate spring retainer 76 and the other connected to actuate rollers 174, 176 and 178.

The movement of lever 146 may be limited by arm 214 to limit acceleration fuel flow as a function of compression air pressure rise $P_c-P_a$ acting against diaphragm 222 thereby overriding the input request derived from control lever 54 position and atmospheric air pressure $P_a$ to avoid engine over fueling. Assuming the air pressure differential $P_c-P_a$ across diaphragm 222 to be relatively low, the arm 214 will act as a stop to prevent lever 146 from following tappet 160 thereby controlling the position of flapper 144 and thus pressure $P_s$ as a function of compressor pressure rise $P_c-P_a$.

The metering valve 76 moves in an opening direction to increase the effective metering area of orifice 126 in response to the increase in pressure $P_s$ acting against servo piston 128. In response to the control lever 54, the governor valve orifice 110 is increased to a maximum by the movement of retainer 276 which compresses spring 270 thereby overcoming the opposing force of centrifugal weights 262 causing sleeve 268 to move accordingly out of registry with orifice 292.

The resulting decrease in fuel pressure $P_1'$ upstream from orifice 292 is transmitted to chambers 100 and 118 causing throttling valve 74 to move in an opening direction to increase pressure $P_2$ and by-pass valve 82 to move in a closing direction under the influence of spring 92 augmented by pressure $P_3$ acting against diaphragm 90. The pressure $P_2$ increases to the level required to establish a predetermined constant pressure differential $P_2-P_3$ across metering orifice 72 in accordance with the effective force of spring 92. The resulting increase in fuel pressure differential $P_2-P_3$ across the increased area of metering orifice 72 produces a corresponding increase in fuel flow to the engine thereby initiating acceleration of the same. The fuel pressure differential $P_2-P_3$ across metering orifice 72 is maintained constant at the predetermined value as the metering valve 76 is actuated to vary the effective flow area of orifice 72 as a function of the increasing compressor air pressure rise $P_c-P_a$ imposed across diaphragm 222 as the compressor speed increases during acceleration.

The position of the metering valve 76 is converted via lever 232 and spring 254 to a position feedback force against diaphragm 222 in opposition to the air pressure differential $P_c-P_a$ to effect stabilization of metering valve 76 at any given differential $P_c-P_a$.

The fuel flow to the engine as established by the compressor pressure rise $P_c-P_a$ may exceed the engine fuel requirements established as a function of control lever 54 position and/or atmospheric air pressure $P_a$. In such a case, the lower fuel limit is established by tappet 160 which engages lever 146 to limit response of lever 146 to arm 214 thereby overriding the compressor pressure rise $P_c-P_a$ input and reducing the travel of metering valve 76 accordingly as function of control lever 54 position and/or atmospheric air pressure $P_a$. In such a case, the position of metering valve 76 is converted via lever 232 and spring 250 to a position feedback force against lever 164 in opposition to the force applied by rollers 74, 76 and 78 to stabilize metering valve 76.

As the free turbine 28 speed approaches the selected value corresponding to the position of control lever 54, the output force of centrifugal weights 262 overcomes the opposing force of spring 270 whereupon the sleeve 268 is urged upwardly against spring 270 causing a reduction in effective flow area of orifice 292. The resulting increase in fuel pressure $P_1'$ upstream from orifice 292 acts against diaphragm 116 causing throttling valve 74 to move in closing direction and against diaphragm 88 causing by-pass valve 82 to move in an opening direction with the fuel pressure differential $P_2-P_3$ across metering orifice 72 and thus fuel flow to the engine decreasing accordingly resulting in the well known governor break effect on fuel flow.

A lagged regenerative feedback control effect is imposed on the motion of sleeve 268 in response to the centrifugal weights 262 force. To that end, the fuel pressure $P_1''$ downstream from valve 310 and in chambers 296 and 316 is equal to the fuel pressure $P_2$ upstream from orifice 290 prior to closing movement of sleeve 268. As the sleeve 268 closes in response to the force of centrifugal weights 262 causing an increase in fuel pressure upstream from orifice 292, a pressure differential $P_1'-P_1''$ is generated across valve 310 which, in combination with the resilient response of spring loaded diaphragm 294 to the increasing pressure $P_1''$ produces a delayed rise in the fuel pressure in chambers 296 and 316. The pressure in chamber 316 acts against sleeve 268 to augment the force derived from weights 262 thereby providing a lagged regenerative feedback force which increases with increasing pressure $P_1'$. Upon stabilization of sleeve 268 and thus fuel pressure $P_1'$, the fuel pressure drop $P_1'-P_1''$ decreases to zero.

Upon reaching the selected free turbine 28 speed, the force of spring 270 is balanced by the opposing forces derived from weights 262 in combination with the pressure $P_1''$ in chamber 316 which, in turn, controls the fuel pressure $P_1'$ and thus by-pass valve 82 to maintain the required fuel pressure differential $P_2-P_3$ across metering orifice 72 for governing operation at the selected speed of free turbine 28.

The above described sequence of operation for an engine acceleration is, in general, reversed for an engine deceleration. Movement of control lever 54 to a lower speed request position results in movement of rollers 174, 176 and 178 toward the pivot axis of lever 164 upsetting the force balance thereon causing the lever 164 to move in a counterclockwise direction as viewed in FIG. 2. The lever 146 engaged by tappet 160 moves accordingly to open flapper valve 144 and reduce fuel pressure $P_s$ which, in turn, drives metering valve 76 in a closing direction. The lever 146 may be engaged by arm 216 of lever 210 which acts as a deceleration limit to prevent fuel flow from decreasing below that required to maintain combustion at the relatively high pressurized air flow delivered by compressor 22 the rotational speed of which, by virtue of the inertia thereof, lags a decrease in fuel flow. The lever 146 and thus opening movement of flapper valve 146 being controlled by arm 216 provides control over the deceleration fuel flow rate in response to the decay of compressor discharge air pressure $P_c$ acting against diaphragm 222. The spring 168 is compressed to establish a broken link between levers 164 and 146 when the arm 216 limits the response of lever 146. As in the case of an engine acceleration, the movement of metering valve 76 in response to pressure $P_s$ is transmitted to lever 232 which, in turn, positions springs 250 and 254 to apply a position feedback force against levers 164 and 210.

The retainer 276 is lifted in response to movement of control lever 54 thereby relaxing governor spring 270 whereupon the force of centrifugal weights 262 in combination with pressure $P_1''$ in chamber 316 acting against sleeve 268 urges sleeve 268 to a position closing orifice 292. The fuel pressure upstream from orifice 292 rises to the $P_1$ level displacing throttling valve 74 toward a closed position and by-pass valve 82 toward an open position thereby decreasing the fuel pressure differential $P_2-P_3$ across metering orifice 72 to a minimum which, in combination with the decreasing flow area of orifice 72, results in a reduction in fuel flow to the engine producing an engine deceleration. As the free turbine 28 speed approaches the selected lower speed, the output force of centrifugal weights 262 decreases accordingly allowing sleeve 268 to move under the influence of spring 270 to open orifice 292 which, in turn, reduces the fuel pressure $P_1$ against diaphragms 116 and 88 to a lower level $P_1'$. The resulting opening movement of throttling valve 74 and closing movement or by-pass valve 82 increases the fuel pressure differential $P_2-P_3$ across metering orifice 72 to the level required to maintain the free turbine 28 speed constant at the selected position of control lever 54.

If desired, an upper limit on the speed of the compressor driving turbine 24 may be established by providing an overspeed governor generally indicated by 318 upstream from governor valve orifice 110. A normally open valve 322 in flow controlling relationship with passage 104 and biased by a compression spring 324 is actuated by a pair of centrifugal weights 326 siutably connected to be rotated by compressor 22 via conventional gear and shaft means generally indicated by 328. Upon reaching a predetermined compressor 22 speed depending upon the force exerted by spring 324, the centrifugal weights 326 overcome the spring 324 causing valve 322 to move in a closing direction thereby increasing fuel pressure $P_1'$ downstream from valve 102 which, in turn, causes throttling valve 74 to move in a closing direction and by-pass valve 82 to move in an opening direction. The resulting decrease in fuel pressure differential $P_2-P_3$ across metering valve 76 causes a corresponding decrease in fuel flow to the engine to limit the speed of compressor 22 and turbine 24.

A minimum fuel flow to the engine is available to the engine at all times by virtue of the adjustable restriction 124 which is in parallel flow relationship with metering orifice 72.

It will be noted that the various fuel servo networks in the above described fuel control system exhaust to conduit 68 at pressure $P_2$ upstream of metering valve 76 thereby maintaining the entire output of fuel pump 46 available for fuel metering purposes. Reference is made to U.S. application Ser. No. 726,798 filed May 6, 1968, in the name of Francis R. Rogers and DeFoe L. Greenawalt (common assignee) for details of a fuel control system employing a similar type servo network arrangement. No claim to such structure, per se, common to both is claimed in the present application.

Various changes and modifications to the above described structure may be made by those persons skilled in the art without departing from the scope of Applicants' invention as defined by the following claims. It will be understood that the various adjustable elements such as flow restrictions 102, 124, 310 as well as spring retainers 94, 230, 246, 248, 300 and support 280 may be adjusted for calibration purposes.

I claim:

1. A fuel control for a variable speed combustion engine having a combustion chamber, said fuel control comprising:
  a source of pressurized fuel;
  a control lever for controlling the operation of the engine;
  a fuel conduit connected to supply fuel to said combustion chamber from said source;
  fuel metering valve means in said fuel conduit for controlling the effective flow area thereof and thus fuel flow to said combustion chamber;
  means responsive to a variable condition of engine operation related to engine power output;
  said control lever and said last named means being operatively connected to said fuel metering valve means for actuating the same to vary fuel flow to said combustion chamber as a function of the position of said control lever and said variable condition of operation during an engine transient from one engine speed to another;
  valve means operatively connected to said fuel conduit for controlling the fuel pressure differential across said fuel metering valve means and thus fuel flow to the engine;
  control means responsive to the position of said control lever and engine speed operatively connected to said last named valve means for controlling the operation thereof to generate a predetermined constant fuel pressure differential across said metering valve means during an engine acceleration to a selected speed and a variable fuel pressure differential as a function of engine speed error to govern the engine at said selected speed.

2. A fuel control as claimed in claim 1 wherein said operative connection between said fuel metering valve means and said control lever and said means responsive to a variable condition of engine operation includes:
  servo means responsive to the position of said control lever and operatively connected to said fuel metering valve means for actuating the same in response to the position of said control lever; and
  stop means actuated by said means responsive to said variable condition of engine operation for limiting the response of said servo means to said control lever as a function of said variable condition.

3. A fuel control as claimed in claim 1 and further including:
  second means responsive to a second variable condition related to engine power output operatively connected to said control lever for modifying the effect thereof on said servo means as a function of said second variable condition.

4. A fuel control as claimed in claim 1 wherein:
  said variable condition of engine operation is an engine generated air pressure.

5. A fuel control as claimed in claim 3 wherein:
  said second variable condition is atmospheric air pressure.

6. A fuel control as claimed in claim 1 wherein said combustion engine is a gas turbine engine having an air compressor driven by a turbine and a separate independently rotatable power output turbine and wherein:

said control means is responsive to the position of said control lever and the speed of said power output turbine.

7. A fuel control as claimed in claim 6 wherein:

said variable condition of engine operation is compressor air pressure rise.

8. A fuel control as claimed in claim 1 wherein:

said valve means for controlling the fuel pressure differential across said fuel metering valve means includes a fuel throttling valve in said fuel conduit upstream from said fuel metering valve means;

first fuel pressure responsive means exposed to the fuel pressure in said fuel conduit downstream from said fuel metering valve means and a control fuel pressure controlled by said control means and responsive to the pressure differential therebetween;

said first fuel pressure responsive means operatively connected to said throttling valve for actuating the same;

a fuel by-pass valve operatively connected to said fuel conduit intermediate said throttling valve and said fuel metering valve means for diverting fuel from said fuel conduit to relatively low pressure fuel associated with said source;

second fuel pressure responsive means exposed to the same fuel pressure differential as said first fuel pressure responsive means and operatively connected to said fuel by-pass valve for actuating the same.

9. A fuel control as claimed in claim 1 wherein:

said valve means for controlling the fuel pressure differential across said fuel metering valve means is responsive to the pressure differential between a control fuel pressure controlled by said control means and the fuel pressure in said fuel conduit downstream from said fuel metering valve means;

said control means includes a branch conduit connected to said fuel conduit upstream from said fuel pressure differential controlling valve means and a relatively lower pressure fuel source;

first and second flow restrictions in series flow in said branch conduit for controlling fuel flow therethrough to generate said control fuel pressure therebetween; and valve means operatively connected to said second restriction and responsive to opposing first and second force generating means responsive to said control lever position and engine speed, respectively, for controlling the effective flow area of said second restriction and thus said control fuel pressure as a function of engine speed error.

10. A fuel control as claimed in claim 9 and further including:

third force generating means operatively connected to said last named valve means for imposing a lagged regenerative force thereon which varies as a function of said control fuel pressure.

11. A fuel control as claimed in claim 10 wherein:

said third force generating means includes a fuel pressure responsive member operatively connected to said valve means;

a passage communicating said branch conduit intermediate said first and second flow restrictions with said fluid pressure responsive member;

a third flow restriction in said passage for restricting fuel flow therethrough;

a variable volume chamber vented to said passage intermediate said fuel pressure responsive member and said third flow restriction and partially defined by resilient means opposing expansion of said variable volume chamber as a result of the fuel pressure therein;

said fuel pressure responsive member being responsive to the fuel pressure in said variable volume chamber which varies as a lagged regenerative function of said control fuel pressure.

References Cited

UNITED STATES PATENTS

| | | | |
|---|---|---|---|
| 2,825,397 | 3/1958 | Hall et al. | 60—39.28 |
| 2,933,130 | 4/1960 | Wright et al. | 60—39.28 |
| 2,986,126 | 5/1961 | Werts | 60—39.28 X |
| 3,032,986 | 5/1962 | Wright | 60—39.28 |
| 3,152,444 | 10/1964 | Peczkowski et al. | 60—39.28 X |
| 3,195,308 | 7/1965 | McCombs | 60—39.28 |
| 3,246,682 | 4/1966 | McCombs | 60—39.28 |

AL LAWRENCE SMITH, Primary Examiner